F. U. Stokes.
Improved Check Rein Hook.

73406

PATENTED
JAN 14 1868

Attest.
E. Zapf
R. Mueller

Inventor.
F. U. Stokes

United States Patent Office.

F. U. STOKES, OF CINCINNATI, OHIO.

*Letters Patent No. 73,406, dated January 14, 1868; antedated January 2, 1868.*

IMPROVED CHECK-REIN HOOK.

*The Schedule referred to in these Letters Patent and making part of the same.*

TO ALL WHOM IT MAY CONCERN:

Be it known that I, F. U. STOKES, of Cincinnati, in the county of Hamilton, in the State of Ohio, have invented a new and useful Improvement in Check-Rein Hooks, which prevents the check-rein from being relieved from the hook voluntarily, or by the action of the horse; and I do hereby declare that the following is a full, clear, and exact description of the construction and operation of the same, reference being had to the annexed drawings, making a part of this specification, in which—

Figure 1:
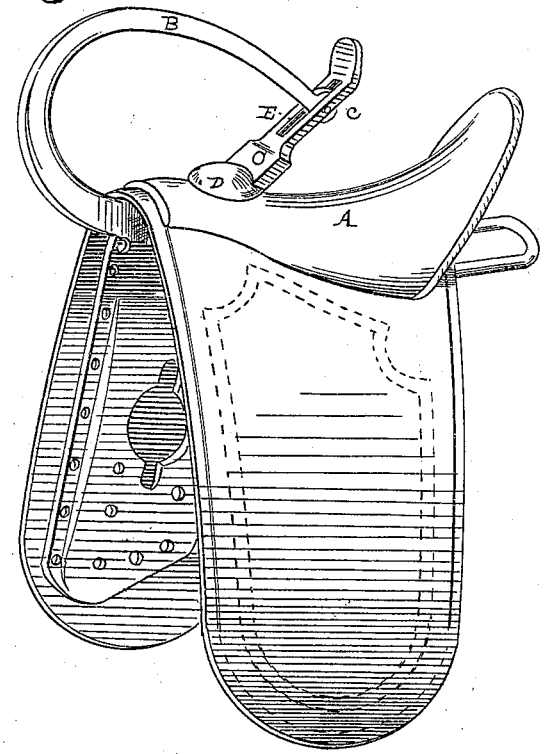

Figure 1 is a perspective view of the harness-pad with hook attached.

Figure 2:
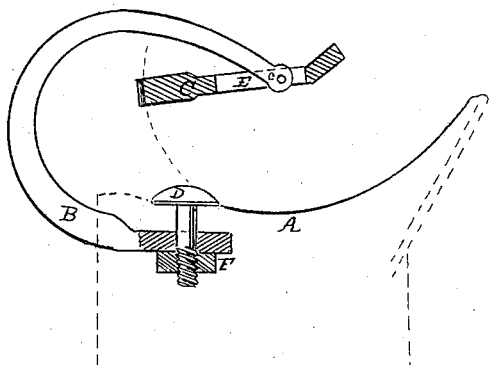

Figure 2, a cross-section of the hook and pad.

A represents an ordinary harness-pad or saddle, B, the check-hook secured to the saddle or pad in the ordinary way, as shown by bolt D and nut F. At the point of the hook where the rein enters there it is swivelled, either by a pin or bending the point of the hook around, as shown at c. C is a piece secured to the point of the hook by the pin c, and works freely on the swivel-pin c, the operation of which is that the drop-piece C will, by its gravity, remain in the position as shown in fig. 1, which entirely closes up the check-hook and prevents the rein from coming out of the hook. To relieve the check-rein from the hook, the upper part of the drop-piece C is pressed down, which raises the lower point, as shown in fig. 2.

What I claim as my invention, and desire to secure by Letters Patent, is—

The drop-piece C, secured to the point of the check-hook as shown at c, for the purpose of closing the check-hook and preventing the rein getting out.

F. U. STOKES.

Witnesses:
E. ZAPF,
PL. MULLER.